June 15, 1965 L. W. GILBERT ETAL 3,189,890
SHAFT POSITION TRANSDUCER
Filed April 10, 1961 4 Sheets-Sheet 1

INVENTORS.
LYNFORD W. GILBERT
ANTHONY J. BUDDEN
BY
*Christie, Parker & Hale*
ATTORNEYS.

June 15, 1965   L. W. GILBERT ETAL   3,189,890
SHAFT POSITION TRANSDUCER

Filed April 10, 1961   4 Sheets-Sheet 2

INVENTORS.
LYNFORD W. GILBERT
ANTHONY J. BUDDEN
BY Christie, Parker & Hale
ATTORNEYS.

June 15, 1965 L. W. GILBERT ETAL 3,189,890
SHAFT POSITION TRANSDUCER
Filed April 10, 1961 4 Sheets-Sheet 3

INVENTORS.
LYNFORD W. GILBERT
ANTHONY J. BUDDEN
BY
Christie, Parker & Hale
ATTORNEYS.

INVENTORS.
LYNFORD W. GILBERT
ANTHONY J. BUDDEN
BY
ATTORNEYS.

United States Patent Office 3,189,890
Patented June 15, 1965

3,189,890
SHAFT POSITION TRANSDUCER
Lynford W. Gilbert, Palos Verdes Estates, and Anthony J. Budden, Torrance, Calif., assignors, by mesne assignments, to Ex-Cell-O Corporation, Detroit, Mich., a corporation of Michigan
Filed Apr. 10, 1961, Ser. No. 101,964
7 Claims. (Cl. 340—347)

This invention relates to shaft position transducers or shaft to digital converters of the incremental displacement type.

Various forms of shaft position transducers are being employed in digital systems, including numerical positioning controls for machine tools and the like. These shaft position transducers may be in the form of a coded disc employed with sensing elements to define a unique numerical position for each position of a shaft. Another form of position transducer that is particularly adaptable for incremental type numerical positioning controls may be characterized as a variable reluctance device. One form of variable reluctance device that has been disclosed comprises a linear scale constructed with lands and grooves defining scale divisions and utilized with a variable reluctance magnetic head that slides over the lands and grooves. The magnetic detector heads are arranged and defined whereby their impedance varies in accordance with their location over a land or groove and thereby give a digital output indication in response to an incremental change of position of the element being digitized. One of the basic problems with the linear scale arrangement is that the scale must be accurately defined in order to provide the accuracy necessary for the digital control system proper and yet the sliding action of the detector heads over the scale causes wear thereof to thereby, in time, tend to destroy the accuracy of the position transducer. It is therefore desirable to provide a shaft position transducer that advantageously employs the concept of variable reluctance or impedance but allows the transducers to be spaced from the scale proper to eliminate the aforementioned wear problems.

The present invention provides a position transducer of the variable reluctance type in which the scale is in the form of a rotary member having spaced lands and grooves on one surface thereof or may be in the form of a gear that is accurately manufactured by conventional hobbing or gear cutting machines, thereby accurately defining the scale increments or divisions of the transducer. The present transducer structure, therefore, is easier and cheaper to assemble and manufacture. The housing for the detector heads may be simply and accurately positioned with respect to the rotary scale or gear and with a minimum of skill to achieve the desired spaced but flux linking relationship, thereby eliminating any wear of the accurately defined rotary scale.

The shaft position transducer or incremental displacement detector of this invention comprises a rigid supporting housing constructed with a plurality of planar surfaces and which housing may be in the form of an equilateral triangle in cross section with a central aperture or receptacle for accepting a rotor having the rotary scale or gear hobbed thereon with a predetermined number of teeth. The electromagnetic detector heads are then simply mounted on the planar surfaces of the housing in a flux linking relationship with the scale or gear and simply located to provide the correct phase relationship between the signals derived from the detector heads. The detector heads are reliably constructed so as to include a three legged magnetic structure having a single turn winding coupled to the center leg. The width of the three legs is defined relative to the width of the lands and grooves of the rotary scale or gear whereby they are located opposite successive and corresponding points thereof to produce a binary variation in impedance of the heads depending on whether the heads are over a land or a groove.

The compact structure for the transducer further allows a third magnetic detecting head to be packaged within the transducer for detecting each complete revolution of the transducer shaft for providing an electrical indication of the reference or zero position of the shaft when the linear motion detection is desired. It will be recognized that in a linear scale arrangement the zero or reference point may be simply provided by using one end of the scale as a reference point. The reference position of the shaft is defined through the provision of a single magnetic tooth constructed and arranged adjacent the rotary scale or gear and placed in flux linking relationship with a reference magnetic head whereby a signal is produced whenever the head is confronted with the tooth.

These and other features of the present invention may be more fully appreciated when considered in the light of the following specification and drawings, in which.

Figure 1:
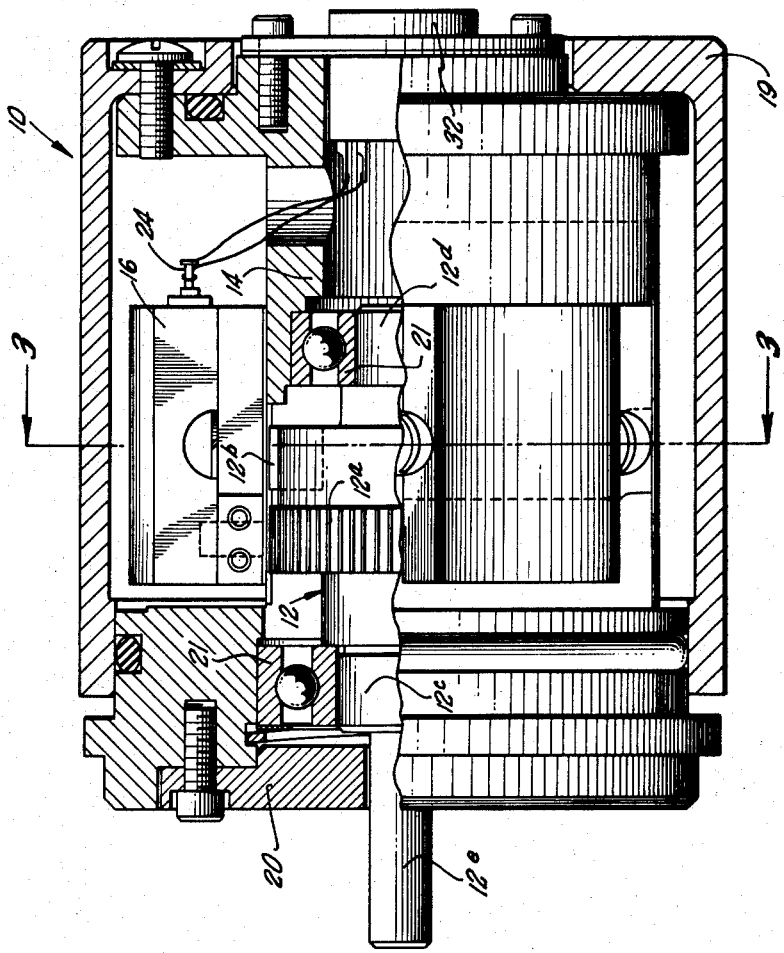
FIG. 1 is a longitudinal cross-sectional view, with portions in elevation, of the assembled position transducer embodying the invention.

Now referring to the drawings, the position transducer 10 will be described in detail. The position transducer 10 basically comprises a rotor 12 and housing 14 adapted to receive the rotor 12 and adapted to mount the electromagnetic detector heads 16, 17, and 18. This arrangement is enclosed by a cover 19 which includes an end cap 20.

Figure 4:
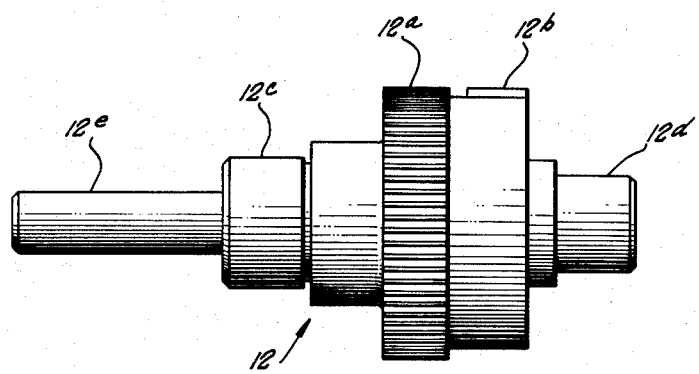
FIG. 4 is a longitudinal elevational view of the detached rotor of the position transducer for the invention showing the rotary scale and zero reference tooth.

The rotor 12 is constructed of a magnetic material and is defined with rotary scale 12$^a$ provided with lands and grooves accurately defined on one surface thereof. The rotary scale 12$^a$ is preferably defined as a gear that is hobbed on the rotor proper whereby the rotor is of unitary construction, as best seen in FIG. 4. In addition, adjacent to the scale member 12$^a$, the rotor 12 is constructed to include a single magnetic tooth identified by the reference character 12$^b$ for providing a reference or zero position. The magnetic tooth 12$^b$ may be in the form of a separate magnetic element mounted to extend radially from the rotor proper or the rotor cut to define a drum with a single tooth to give an unambiguous output indication for each revolution of the rotor. To this end, the width of the magnetic tooth 12$^b$ is defined relative to the magnetic structure for the zero or reference detector head 18, as will be described more fully hereinafter. The stepped construction of the rotor 12 includes the portions 12$^c$ and 12$^d$ defined to accommodate bearings for rotatably supporting the rotor. A shaft portion 12$^e$ extends outwardly from the bearing mounting portion 12$^c$ to be coupled to a shaft to be digitized. The compact construction of the rotor 12 may best be appreciated in connection with a practical embodiment thereof wherein the gear is defined with 125 teeth, a diametral pitch of 120, and a pitch diameter of 1.0417 inches. As in the case of a linear scale, the increments or scale divisions of the rotary member 12$^a$ are defined between corresponding points of successive lands or grooves. The width of these grooves or lands is also defined relative to the magnetic structure for the detector heads 16 and 17, as will be made more evident immediately hereinafter.

Figure 2:
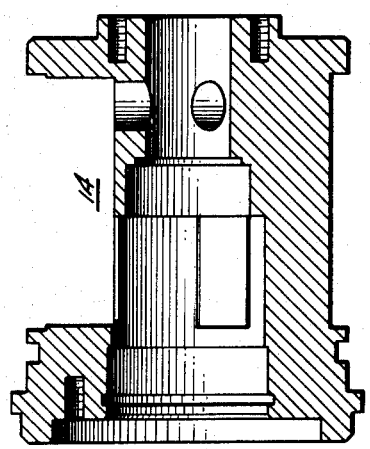
FIG. 2 is a cross-sectional view of the detached housing for the transducer of FIG. 1.
Figure 3:
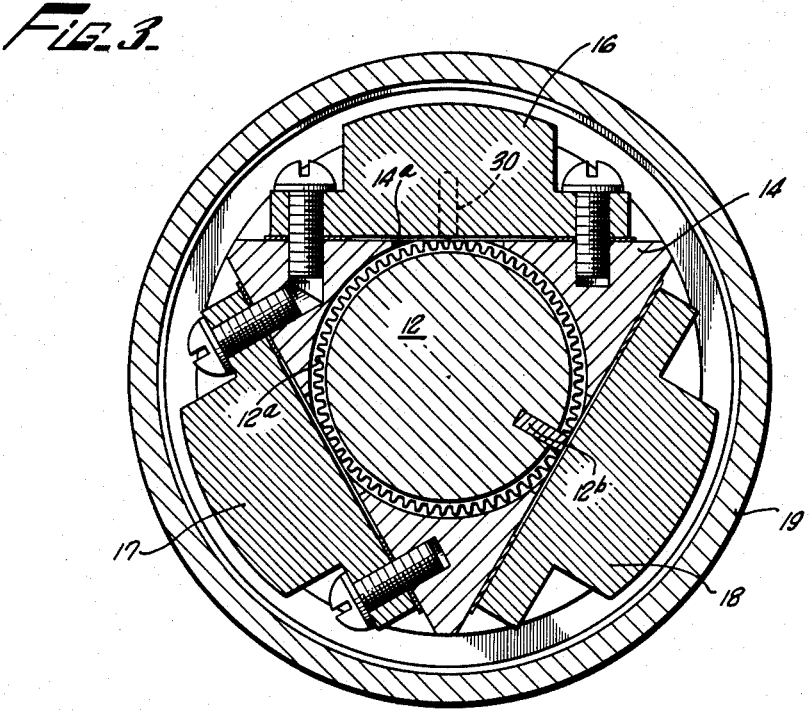
FIG. 3 is a cross-sectional view of the position transducer taken along the line 3—3 of FIG. 1.

The housing 14 is defined with a longitudinally extending central aperture, as best seen in FIG. 2, to accommodate the rotor 12. The housing 14 is of a rigid construction such as provided by stainless steel, and has its outer surfaces defined to provide planar mounting surfaces for the electromagnetic detecting heads 16–18. To this end, it is advantageously constructed whereby it has an equilateral triangular cross section; see FIG. 3. The central aperture is of a diameter to not only accommodate the rotary scale or gear 12$^a$ but slightly greater to extend through the planar side walls to allow access to the gear by the detecting heads 16–18 through the apertures, such as the one identified by the reference character 14$^a$. The housing 14 additionally mounts a pair of bearings 21 for receiving the bearing portions 12$^c$ and 12$^d$ of the rotor 12. The rotor shaft 12$^e$ is of a length to extend outwardly from the front or left-hand end of the housing 14, as illustrated.

An important feature of this invention is the construction of the housing 14 with the planar surfaces whereby the detecting heads 16–18 may be readily mounted thereon and in a spaced but flux linking relationship with the rotary scale or gear 12$^a$ with a minimum of efforts and skill. The spacing or gap between the detector heads and the gear 12$^a$ may be readily adjusted and maintained in position by means of shims located between the detector heads and the planar surface of the housing 14.

Figure 5:
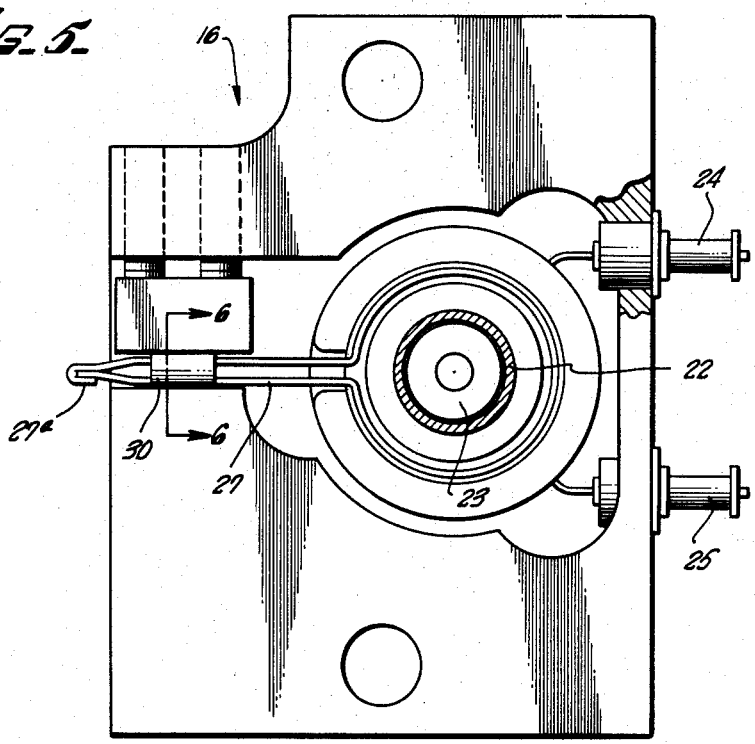
FIG. 5 is a detached view of the electromagnetic detector head assembly for the transducer of FIG. 1.
Figure 6:
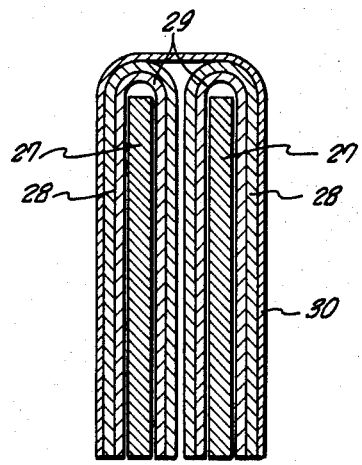
FIG. 6 is a cross-sectional view taken along the line 6—6 of FIG. 5 and showing the relationship of the detector magnetic structure and the rotary scale.
Figure 6:
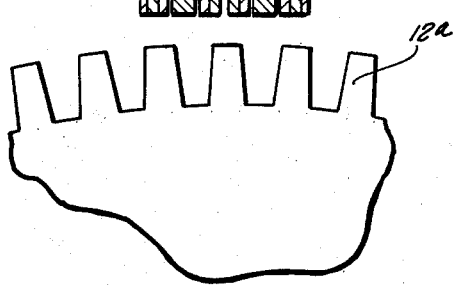
Figure 7:
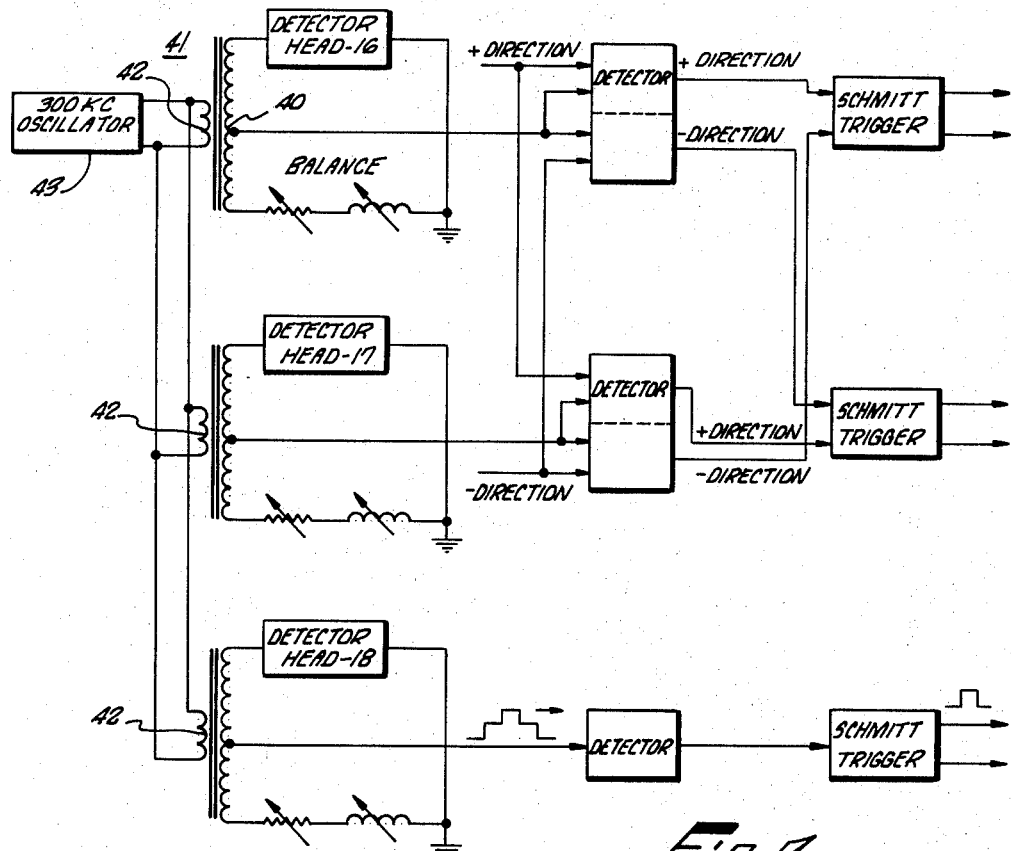
FIG. 7 is a schematic diagram of the electrical circuit utilized with the electromagnetic detector heads for providing a digital output indication.

The electromagnetic detector heads 16–18 may each be of the same construction and a typical construction is shown in FIGS. 5 and 6 wherein the detector head 16 is illustrated. The detector head 16 essentially comprises two portions, a transformer portion and a detector portion. The transformer portion includes a primary winding 22 mounted on a bobbin 23 and is adapted to be connected to a source of alternating current energy by means of the terminals 24 and 25 mounted on the body proper for the head structure. A single turn winding 27 is mounted concentrically with the primary winding in inductive relationship therewith and extends longitudinally outwardly therefrom with its ends crimped or soldered together at the point 27$^a$ to form a closed loop. The single turn winding 27 is in the form of a thin copper sheet or foil on the order of .0108 inch thick.

The magnetic detector portion for the head 16 is best shown in FIG. 6 and includes a pair of U-shaped strips of magnetic permalloy or, as shown, a single W-shaped strip, which may be a permalloy strip on the order of .001 inch in width, to form three magnetic legs. The magnetic structure is identified by the reference character 28. It will be noted that the center leg about which the single turn coil 27 is coupled is essentially double the thickness of the outer two legs, however, it has been found to have little effect upon the overall magnetic characteristic of the detector and, more particularly, the output signal for the head 16. In addition, a thin insulating sheet material is provided between the single conductor 27 and the magnetic structure 28 and which insulator is identified by the reference character 29. The outer surfaces of the magnetic material 27 are also provided with an insulating material 30.

The width of the three legged magnetic structure or permalloy is best seen in connection with the width of the teeth of the gear 12$^a$, as illustrated in FIG. 6. The three legs of the detecting structure are opposite three successive teeth and the magnetic structure and teeth are defined with respect to one another whereby they are substantially the same width, as shown. Therefore, with this dimensional relationship the three legs are always opposite successive corresponding points of the gear 12$^a$. The output impedances may then be defined as binary impedances having one value when the legs are opposite a tooth, or a high value, and another value, or low value, when they are opposite a groove or the openings between the teeth, as will be more evident hereinafter. The orientation of the magnetic detecting structure with regard to the gear 12$^a$ is further identified in dotted outline in FIGS. 1 and 3 for the detector head 16.

Another important aspect of the invention lies in the construction of the detector heads whereby they are defined with a planar detecting surface and may be simply mounted on the planar faces of the housing 14. A careful examination of FIG. 5 will show that the detecting surfaces of the heads are substantially co-planar with the mounting faces of the housing 14 so as to place the detecting heads in parallel with the gear teeth 12$^a$. This advantageous construction minimizes the assembly problems and skill required of the assembler. In addition, this packaging arrangement allows for axial shifting of the rotor 12 without effecting the positions of the detector heads.

The detector heads are mounted on the planar surfaces of the housing 14 with the planar faces shown in FIG. 5 adjacent the faces of the housing 14 to be exposed to the rotor 12 and are suitably secured thereto by fasteners or the like. The detecting heads 16 and 17 provide the digital output signals and must be mounted with regard to corresponding points on the gear 12 to provide output signals that have a 90 degree phase relationship. The detector head 18 or zero reference head may be of the same construction as the detector heads 16 and 17, however, the particular head construction described need not be employed and any type of detecting head that will provide an output signal upon being confronted with the magnetic tooth 12$^d$ will suffice for purposes of this invention. When the particular detector head 16 is employed as the reference head 18, the tooth 12$^b$ preferably has a width at least equal to the width of the entire magnetic structure so as to bridge each leg.

The housing 14 is enclosed by a U-shaped cover 19 secured thereto by fasteners or any other suitable means, and is slidably received thereon in a sealed relationship over the right hand end, as shown in FIG. 1. The cover 19 is further provided with a central aperture to receive an electrical receptacle 32 to which the lead wires from the terminals 24 of the detector heads are connected, that is, the lead wires from the primary winding of the transformer 22 are connected by means of the terminals 24 to the terminals of the connector 32. The opposite end of the housing 14 is enclosed by means of the end cap 20 secured thereto and provided with a central aperture to accommodate the shaft 12$^e$ of the rotor 12.

Now referring to FIGS. 7 through 10, a typical application of the position transducer 10 will be described. Each of the detector heads 16–18 are included in a bridge circuit arrangement whereby the heads either balance or unbalance the circuit. The bridge arrangements of these transducers are identical and therefore only the one bridge arrangement need be described. The bridge circuit includes the secondary winding 40 of a transformer 41, for example, and with each half of this secondary forming two legs of the bridge. A third leg is formed by the series arrangement of a variable resistor and an inductor while the fourth leg comprises the transducer head 16. The primary winding 42 for the transformer 41 is coupled to an alternating current oscillator shown as a 300 kilocycle oscillator 43. The oscillator 43 is coupled to each of the bridge circuits, including the transducers 17 and 18, by means of separate primary windings 42, as illustrated. The alternating current source is preferably selected to be higher than the highest expected frequency of the impedance change of the head in a range providing optimum head performance and the head therefore modulates this alternating current source.

The balance resistor and inductor are controlled and adjusted so that when the transducer head 16 is over a groove or between the teeth of the gear 12ª, a null or balance condition of minimum impedance will exist. The maximum impedance relationship results when the transducer head is positioned over a tooth or a land, the bridge becomes unbalanced, and a maximum bridge signal results. This binary variation in impedance value as the detecting head 16 is confronted with a land or a groove effectively modulates the alternating current signal applied to the bridge, producing a signal of the type shown in FIGS. 8 and 9.

Figures 8, 9:
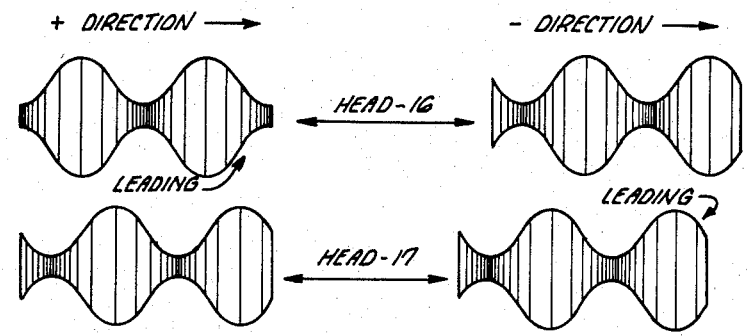
FIGS. 8, 9, and 10 are graphical illustrations of wave forms appearing at various points in the circuit of FIG. 7.
Figure 10:
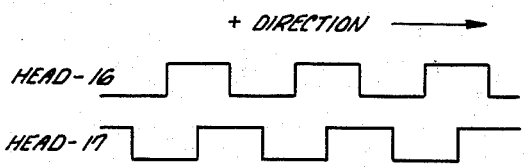

Now assuming that the direction of rotation of the shaft 12ᵉ is in a positive direction, the signal derived from the bridge is applied to an individual detecting and amplifying arrangement shown in block form as comprising a pair of sections. The detecting sections are alternately utilized, depending on whether the rotation is positive or negative. The signals from the detector heads 16 and 17 are shown in FIG. 8 for this assumed positive direction, and it will be noted that they comprise the 300 kilocycle signal functioning as a carrier and having a sinusoidal envelope, the sinusoidal envelope varying in accordance with the variations in the impedance of the aforementioned bridge circuit. It should also be noted that the phase relationship of these R.F. modulated signals is such that the signal from the detector head 16 is leading the signal from the detector head 17 by 90 degrees. This modulated signal is amplified and half-wave detected to produce an output signal having the modulation envelope without the R.F. which is applied to the illustrated Schmitt triggers. The Schmitt triggers then shape this input signal to provide essentially square wave output signals, as shown in FIG. 10, and which output signals have the same 90 degree phase relationship as the input signals. The output signals for the Schmitt triggers are shown in FIG. 10 and may also include the complementary signals therefrom.

If the direction of rotation of the shaft 12ᵉ is in the negative direction, the opposite halves of the detecting amplifiers are utilized in connection with the programmed negative direction signal applied thereto and then the electronic circuit handling of the signals from the detecting heads are essentially the same except that the phase relationship is such that the signal from the detecting head 17 is leading rather than lagging the signal from the detecting head 16.

This same balance arrangement holds for the zero or reference detector head 18 and which detector head provides a signal of stepped wave form with a peak output occurring when the tooth 12ᵇ is located completely under the three legs of the magnetic detecting structure. The detector for the head 18, however, is triggered when the magnetic tooth 12ᵇ confronts the first leg of the detecting head 18 and then is coupled to a Schmitt trigger to provide the desired square wave output.

A position transducer embodying the present invention has been employed in our co-pending application entitled Machine Tool, bearing Serial No. 69,203, and filed November 14, 1960, and assigned to the same assignee as this invention. It should be noted that in this copending patent application, however, the transducer does not employ the reference tooth 12ᵇ and the corresponding detecting head.

In a typical application, the position transducer 10 is used to detect 0.0001 inch increments at position speeds up to 120 inches per minute. The transducer also may be used to detect 0.001 inch increments at speeds of 200 inches per minute or more.

It should therefore be apparent that the present invention has advanced the state of the art and provides an inexpensive position transducer of precision construction, low torque load, and long life that may be simply and easily manufactured.

What is claimed is:

1. An incremental displacement detector comprising a supporting housing having a substantially equilateral triangular cross section and a central circular aperture of a diameter extending through the side walls of said housing to allow access to the central aperture, electromagnetic detector heads mounted on said housing on at least a pair of said side walls, a shaft mounted in said central aperture defined with an integral magnetic gear hobbed thereon of a predetermined number of teeth whereby a scale increment includes the circumferential distance between the corresponding edges of successive teeth, means for supporting said shaft in the housing to allow relative movement between the shaft and housing, each of said detector heads including a three legged magnetic detector structure and a single turn detecting coil coupled to the center leg, said magnetic legs being spaced from said gear and defined relative to the gear teeth whereby they are all located opposite successive corresponding points thereof in flux linking relationship to cause the impedance of the head to vary in a binary fashion when said coil is energized in accordance with the location of the legs of the detector structure over successive teeth or between successive teeth.

2. An incremental displacement detector comprising a supporting housing having a substantially equilateral triangular cross section and a central aperture of a diameter extending through the side walls of said housing to allow access to the central aperture, an electromagnetic detector head mounted on said housing on at least a pair of said side walls, a shaft of magnetic material mounted in said central aperture defined with an integral gear hobbed thereon of a predetermined number of teeth whereby a scale increment includes the circumferential distance between the corresponding edges of successive teeth, said shaft further including a single magnetic tooth defined thereon adjacent said gear and extending radially therefrom, means for supporting said shaft in the housing to allow relative movement between the shaft and housing, each of said detector heads including a magnetic structure having three legs each of substantially the same width as a gear tooth and defined to be located opposite successive corresponding points and a single turn coil coupled to the center leg to cause the impedance of the head to vary in a binary fashion when said coil is energized, said housing is further defined to maintain said heads and the gear in a spaced but flux linking relationship, and another electromagnetic detector head mounted on the remaining wall of said housing in a spaced but flux linking relationship with said single magnetic tooth to detect the presence thereof upon relative movement between said housing and shaft.

3. An incremental displacement detector comprising a supporting housing defined with three planar mounting surfaces and a central circular aperture of a diameter extending through the side walls of said housing, an electromagnetic detector head mounted on said housing on each of said side walls, a shaft of magnetic material mounted in said central aperture defined with a gear hobbed thereon of a predetermined number of teeth whereby a scale increment includes the circumferential distance between the corresponding edges of successive teeth, said shaft further including a single magnetic tooth defined thereon adjacent said gear and extending radially therefrom, means for supporting said shaft in the housing to allow relative movement between the shaft and housing, each of said detector heads including a magnetic structure having three legs each of substantially the same width as a gear tooth and defined to be located opposite successive corresponding points and a single turn coil coupled to the center leg to cause the impedance of the head to vary in a binary fashion when said coil is energized, said single gear tooth having a width of at least the combined width of said three legs of the magnetic structure, said housing is further defined to maintain said heads and the gear in a spaced but flux linking relationship whereby the impedance of said heads varies in a fashion to modulate an alternating current applied to the coils thereof as the legs are confronted with the magnetic gear teeth or the grooves therebetween, one of said electromagnetic detector heads is mounted on said housing in a spaced but flux linking relationship with said single magnetic tooth to provide an electrical output signal upon being confronted with the single tooth when the coil therefor is energized.

4. An incremental displacement detector comprising a rigid supporting housing having a plurality of planar surfaces defined by intersecting planes longitudinally passed therethrough and a central opening, an electromagnetic detector head mounted on each of said planar walls, a magnetic rotor mounted in said central aperture and constructed with a portion having lands arranged with spaced grooves in one peripheral surface thereof providing a predetermined unit scale division and located to place a pair of said detector heads in a spaced but flux linking relationship therewith, said rotor further including a reference tooth defined adjacent said lands and grooves and located to be in spaced but flux linking relationship with the other detector head and means for rotatably supporting said rotor in the housing adjacent said gear to allow relative rotation between the rotor and the housing, each of said detector heads including a three-legged magnetic detector structure and a single turn detecting winding coupled to the center leg thereof, said magnetic legs being defined relative to the width of the lands and the grooves whereby they are all located opposite successive corresponding points thereof to cause the impedance of the heads to vary in a binary fashion when said coil is energized in accordance with the location of the legs over successive teeth or between successive teeth, and a cover enclosing said housing defined to allow the rotor shaft to be accessible.

5. An incremental displacement detector as defined in claim 4 including transformer means integral with the detector heads for applying an alternating current signal of a predetermined frequency relative to the rate of impedance changes to at least said first-mentioned pair of detector heads whereby the applied signal is modulated, said pair of detector heads being supported in flux linking relationship with the gear to provide a pair of signals having a 90 degree phase relationship, and circuit means coupled to each of said detector heads for providing a digital output signal.

6. An incremental displacement detector comprising a rotor having a magnetic portion constructed with lands arranged with spaced grooves in one peripheral surface thereof providing predetermined increments of scale division, a supporting housing having at least a single planar mounting surface defined by an intersecting plane longitudinally passed therethrough and a central aperture defined to receive and enclose at least the grooved portion of the rotor, means for mounting the rotor in said housing to allow relative motion between same, said housing including an aperture arranged in at least one of the planar surfaces of said housing to allow access to the grooved portion of said rotor, at least a single variable impedance detector head having a detecting portion constructed and defined as a planar surface mounted on said one surface of the housing whereby the adjacent surfaces of the detector head and the housing are essentially co-planar thereby placing the detecting surface of the head in parallel relationship with the grooved portion of the rotor.

7. An incremental displacement detector comprising a magnetic rotor having a gear hobbed thereon intermediate the ends thereof, a supporting housing having a plurality of planar mounting surfaces defined by intersecting planes longitudinally passed therethrough and a longitudinally extending central aperture defined to receive said rotor and house at least the gear thereof, means for mounting the rotor in said housing to allow relative motion between same, said housing including apertures provided on the planar surfaces of said housing to allow access to the gear of said rotor, and at least a pair of variable impedance detector heads having a magnetic detecting portion constructed and defined as a planar surface mounted on separate planar surfaces of said housing whereby the adjacent surfaces of the detector heads and the housing are essentially co-planar and the detecting surfaces of the heads are parallel with the teeth of said gear in spaced but flux linking relationship, the planar surfaces of the housing being further defined to allow the detecting heads to be mounted therein whereby the signals derived therefrom have a predetermined out of phase relationship.

References Cited by the Examiner

UNITED STATES PATENTS

| | | | |
|---|---|---|---|
| 2,794,851 | 6/57 | Morris | 340—347.3 |
| 2,938,198 | 5/60 | Beman et al. | 340—347 |
| 3,068,386 | 12/62 | Jaeger et al. | 340—347 |

MALCOLM A. MORRISON, *Primary Examiner.*

JOHN F. BURNS, *Examiner.*